(12) United States Patent
Martens et al.

(10) Patent No.: US 8,630,591 B1
(45) Date of Patent: Jan. 14, 2014

(54) CALIBRATION METHODS FOR RF RECEIVER GAIN RANGING SYSTEMS

(75) Inventors: Jon Martens, San Jose, CA (US); Thomas Albrecht, San Jose, CA (US)

(73) Assignee: Anritsu Company, Morgan Hill, CA (US)

( * ) Notice: Subject to any disclaimer, the term of this patent is extended or adjusted under 35 U.S.C. 154(b) by 156 days.

(21) Appl. No.: 13/193,321

(22) Filed: Jul. 28, 2011

(51) Int. Cl.
 *H04B 17/00* (2006.01)
(52) U.S. Cl.
 USPC .............. 455/67.11; 455/3.01; 455/232.1
(58) Field of Classification Search
 USPC .............. 455/3.01, 67.11, 232.1, 522
 See application file for complete search history.

(56) References Cited

U.S. PATENT DOCUMENTS 6,066,953 A * 5/2000 Wadell .................. 324/601
7,865,160 B2 * 1/2011 Binzel et al. .............. 455/226.2

* cited by examiner

*Primary Examiner* — Tuan H Nguyen
(74) *Attorney, Agent, or Firm* — Fliesler Meyer LLP

(57) ABSTRACT

Systems and methods are provided for calibrating a receiver in an RF system having a device under test (DUT) configured to receive at least one input signal and output at least one response signal. A method comprises setting a drive level of the RF system and making a pair of measurements at the drive level. Each of the measurements is made in a different gain state at a receiver. The method also comprises calculating a calibration factor for the receiver which is a ratio of the pair of measurements. These systems and methods can be used to calibrate receivers while preserving vector information and removing dynamic match effects.

16 Claims, 3 Drawing Sheets

CALIBRATION METHODS FOR RF RECEIVER GAIN RANGING SYSTEMS

BACKGROUND

1. Technical Field

The present invention relates to receivers, such as measuring receivers used in vector network analyzers (VNAs) and in particular to calibration methods for RF receiver gain ranging systems.

2. Related Art

Receivers, particularly measuring receivers used in VNAs, can use radio frequency (RF) gain ranging to optimize the trade-off between compression and noise floor. In contrast to the more common intermediate frequency (IF) gain ranging, RF gain ranging is often used when the receiver would otherwise be very noise figure-challenged. In such a structure, a variable gain stage is placed near the front-end of the receiver prior to down-conversion.

Measuring systems generally rely on calibration, to ensure accurate measurement results. Receivers, such as those described above which can operate in multiple gain states, need to be calibrated across those gain states. A typical calibration technique includes injecting a training signal and then measuring the receiver output in two gain states. The ratio of the output in the first state to the output in the second state can then be calculated. Generally, phase is not preserved in this technique or it requires a more complex synchronization scheme between the training signal and the receiver. This approach is thus inadequate for most vector measurement applications.

Another typical technique uses the ratio of a test signal (TEST), output by a particular receiver, to the input signal (REF), received by the device under test, as the calibration value since it is often used anyway in correction algorithms. This term is commonly called transmission tracking (etf) and is used as a normalizer when applying calibrations. Different values of this normalizer are stored for the different gain states and the appropriate one is chosen at measurement time based on the current gain state. As shown below, the '~' denotes a measurement taken while the instrument is in gain state 2 (state2).

$$etf_{state1} = \left(\frac{TEST}{REF}\right)_{state1}$$

$$etf_{state2} = \left(\frac{\tilde{TEST}}{\tilde{REF}}\right)_{state2}$$

A problem is that the state of the drive system during these calibration steps in general will not be the same as the state during the actual measurement of a device under test (DUT). In general, the match of the drive system will be a function of that state and thus mismatch ripple can change between calibration and measurement. Among other issues, the requirement not to overload the receiver during calibration will often result in some extreme states of this drive system and can lead to larger errors.

SUMMARY

Systems and methods are provided for calibrating a receiver in an RF system having a device under test (DUT) configured to receive at least one input signal and output at least one response signal. A method comprises setting a drive level of the RF system and making a pair of measurements at the drive level. Each of the measurements is made in a different gain state at a receiver. The method also comprises calculating a calibration factor for the receiver which is a ratio of the pair of measurements. These systems and methods can be used to calibrate receivers while preserving vector information and removing dynamic match effects.

BRIEF DESCRIPTION OF THE DRAWINGS

Further details of the present invention are explained with the help of the attached drawings in which.

DETAILED DESCRIPTION

In a measuring receiver context, one requirement is that the relative gain states of the variable gain stage must be calibrated so that the measurement results reported by the instrument reflect the signal amplitude and phase at the port rather than just after the variable gain stage. In accordance with embodiments of the present invention, improved methods are provided for performing calibration in a measuring receiver context where vector information can be retained. In accordance with an embodiment, these improved methods can include taking multiple measurements at different gain states where the drive system configuration is the same, or at least where its match is invariant. This can remove dynamic match effects in the drive system from the calibration factor, and retain vector information. Evaluation of the calibration factor can be accomplished with a transmission or reflect standard, depending on the port configuration, or any standard or device whose properties are known using appropriate signal levels for each gain stage. This evaluation can be combined with a user calibration for correction of other parameters.

Systems and methods are provided for calibrating a receiver in an RF system having a device under test (DUT) configured to receive at least one input signal and output at least one response signal. A method comprises setting a drive level of the RF system and making a pair of measurements at the drive level. Each of the measurements is made in a different gain state at a receiver. The method also comprises calculating a calibration factor for the receiver which is a ratio of the pair of measurements.

Figure 1:
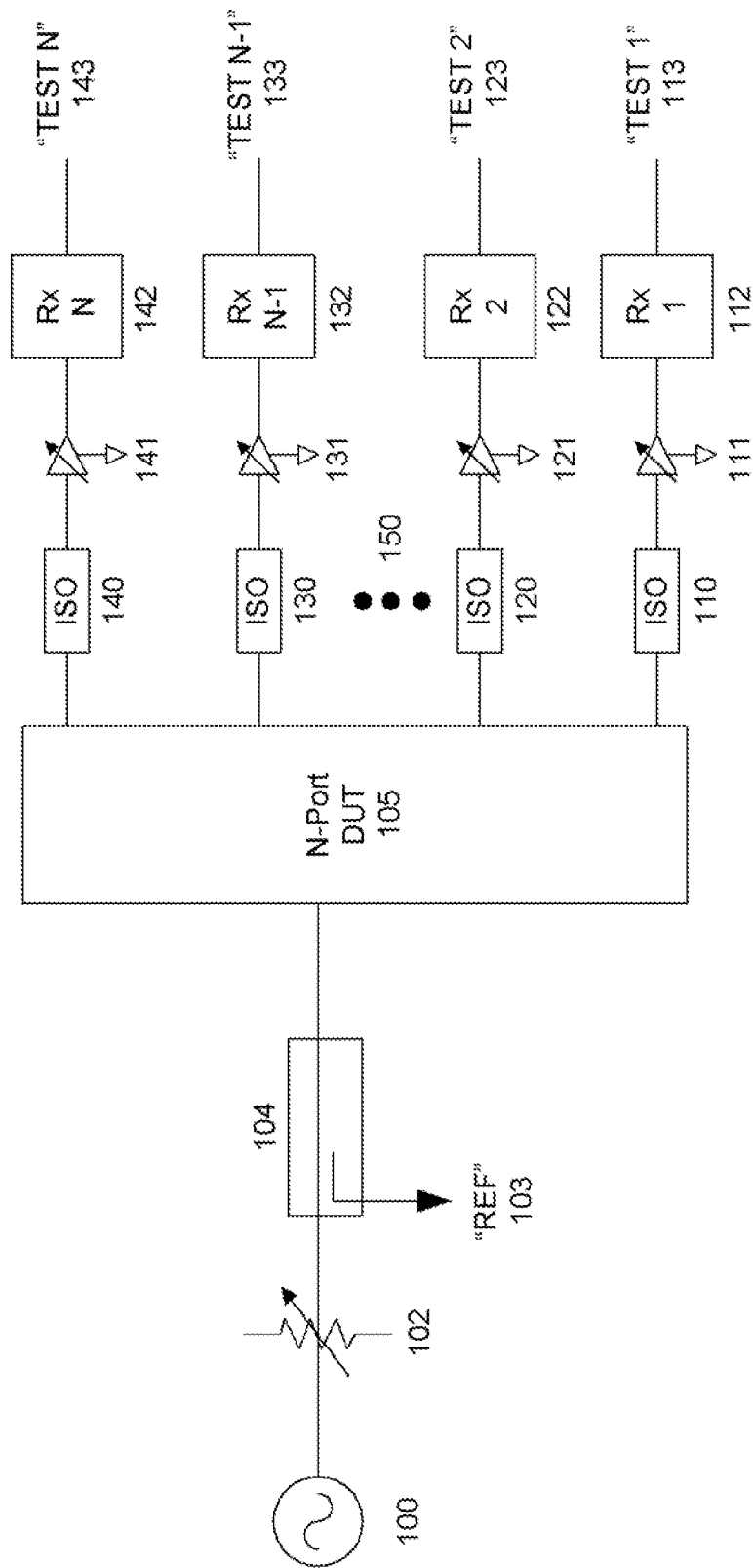
FIG. 1 shows a diagram of a measuring transceiver, in accordance with an embodiment.

FIG. 1 shows a diagram of a measuring transceiver, in accordance with an embodiment. As shown in FIG. 1, a signal source 100 can send a signal through a variable attenuator 102 to a N-port device under test (DUT) 105. A portion of this signal, REF 103, can be extracted via coupler 104. Each port of the N-port DUT can be connected to an ISO block 110, 120, 130, and 140, which can be couplers, attenuators, isolators, or any other structure which can provide sufficient match isolation between each variable gain stage 111, 121, 131, and 141, and the N-port DUT. Each variable gain stage is connected to a different receiver 112, 122, 132, and 142, which outputs a signal 113, 123, 133 and 143.

As described above, typical methods of calibration can involve taking measurements in different gain states. Generally, the drive level of the drive system will be different during calibration and during actual testing of a DUT. This can result in errors due to this mismatch.

However, in accordance with an embodiment, a calibration factor can be calculated by making a pair of measurements at the same drive level (to ensure a consistent match), but using different gain states in order to create a cancelable ratio, as shown below.

$$Q_m = \frac{(TEST_m)_{state1}/REF}{(TEST_m)_{state2}/REF} = \frac{(TEST_m)_{state1}}{(TEST_m)_{state2}}$$

Where m=1 . . . N (for any of N ports available on a particular DUT)

By taking the measurements at the same drive level, dynamic match effects in the drive system can be removed from the calibration factor. Additionally, in this example, the intermediate ratios with REF can be stored to maintain phase coherence of the computation. Because of the unified drive level and hence match state, the REF terms can cancel in this case. This factor can then be applied to incoming $TEST_m$ data (for the gain state change described) prior to further computations. Alternatively, it can be applied to calibration coefficients prior to applying a calibration, or applied later in the post-processing chain if conventional calibrations are not being used.

In accordance with an embodiment, the variable gain stage can be structured so its state change does not significantly affect the standing wave behavior between the drive system and the path termination. This can be accomplished through amplifier design, switched padding after a buffer stage, or other techniques as are known in the art, but this is usually not a problem due to the relative isolation between that stage and the main drive line.

In contrast to the prior art examples, in accordance with an embodiment, phase integrity can be maintained without going to extremes in synchronization and there is increased immunity to match changes with power level and hence lower measurement uncertainty. Additionally, multiple correction tables need not be stored for each gain state, instead a correction factor or factors can be stored which can require less memory.

Figure 2:
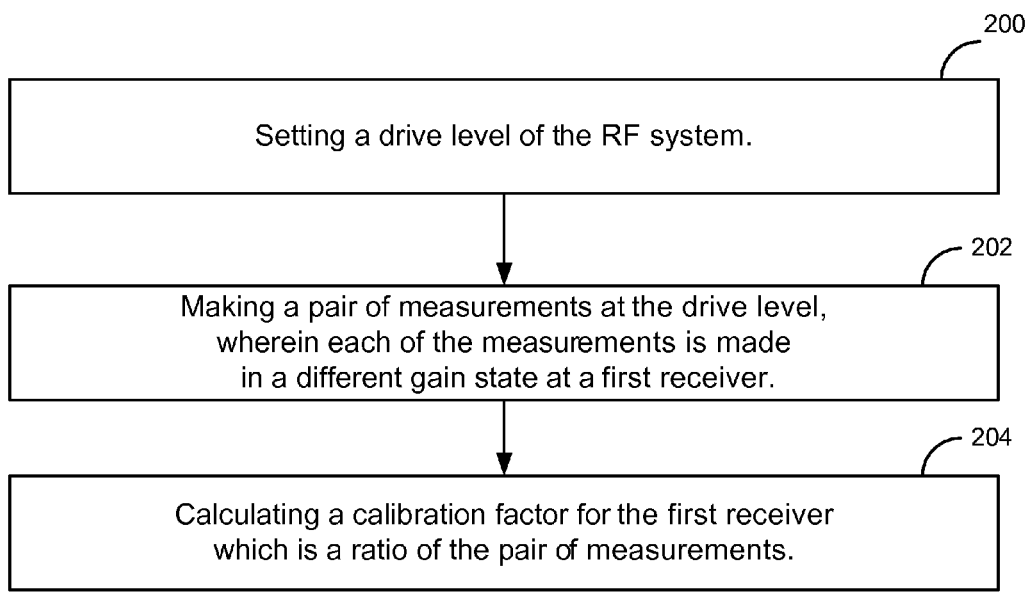
FIG. 2 shows a flowchart of a method for calibrating a receiver in an RF system having a device under test (DUT) configured to receive at least one input signal and output at least one response signal. At step 200, a drive level of the RF system is set.

FIG. 2 shows a flowchart of a method for calibrating a receiver in an RF system having a device under test (DUT) configured to receive at least one input signal and output at least one response signal. At step 200, a drive level of the RF system is set. At step 202, a pair of measurements are made at the drive level, wherein each of the measurements is made in a different gain state at a receiver. At step 204, a calibration factor for the receiver is calculated, which is a ratio of the pair of measurements.

Figure 3:
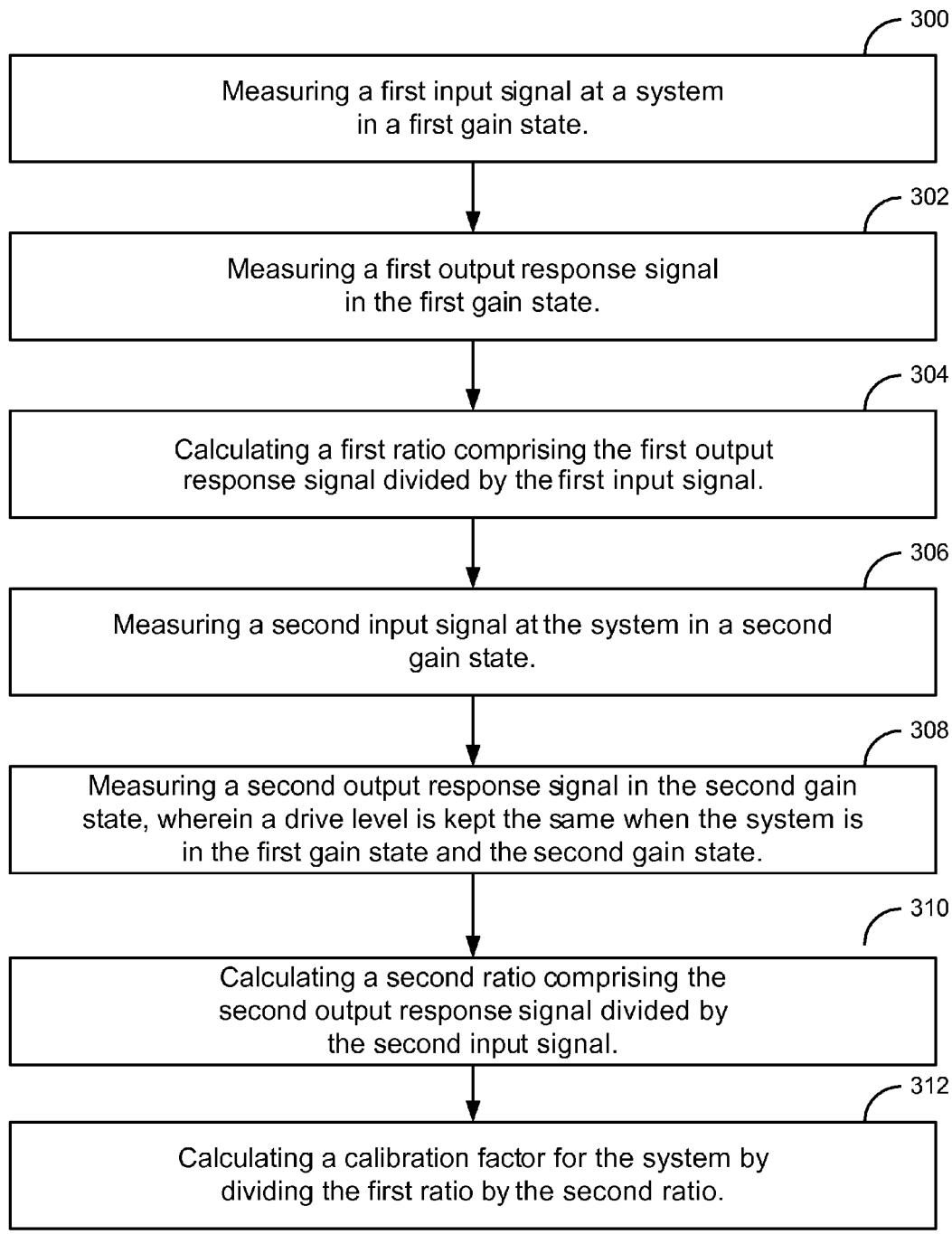
FIG. 3 shows a flowchart of a method for calibrating an RF system, in accordance with an embodiment.

FIG. 3 shows a flowchart of a method for calibrating an RF system, in accordance with an embodiment. At step 300, a first input signal at a system in a first gain state is measured. At step 302, a first output response signal in the first gain state is measured. At step 304, a first ratio comprising the first output response signal divided by the first input signal is calculated. At step 306, a second input signal at the system in a second gain state is measured. At step 308, a second output response signal in the second gain state is measured, wherein a drive level of the drive system is kept the same when the system is in the first gain state and the second gain state. At step 310, a second ratio comprising the second output response signal divided by the second input signal is calculated. At step 312, a calibration factor for the system by dividing the first ratio by the second ratio is calculated.

In accordance with an embodiment, the method shown in FIG. 3 can further comprises changing a gain state of the system from the first gain state to the second gain state using a variable amplifier. Alternatively, the method shown in FIG. 3 can further comprise changing a gain state of the system from the first gain state to the second gain state using a variable attenuator. In accordance with an embodiment, each output response signal is received from a same calibration standard. In accordance with an embodiment, the method shown in FIG. 3 can further comprise storing the first and second ratios to maintain phase coherence of the calibration factor.

Although the present invention has been described above with particularity, this was merely to teach one of ordinary skill in the art how to make and use the invention. Many additional modifications will fall within the scope of the invention, as that scope is defined by the following claims.

What is claimed is:

1. A method for calibrating a receiver in a radio frequency (RF) system connected with a device under test (DUT) configured to receive at least one input signal from the RF system and output at least one response signal, comprising:
    setting a drive level of the RF system;
    obtaining a plurality of measurements at the set drive level, wherein two or more of the measurements are obtained at different gain states of the at least one response signal received at the receiver;
    wherein obtaining the plurality of measurements at the set drive level includes
        measuring a first input signal and measuring a first output response signal, in a first gain state,
        calculating a first ratio comprising the first output response signal divided by the first input signal,
        measuring a second input signal and measuring a second output response signal, in a second gain state, and
        calculating a second ratio comprising the second output response signal divided by the second input signal; and
    calculating a calibration factor for the receiver based on the measurements.

2. The method of claim 1, wherein a variable amplifier is used to change the gain state of the system.

3. The method of claim 1, wherein a pair of the measurements includes an input signal and an output response signal, and wherein the receiver receives the output response signal using a coupler.

4. The method of claim 1, wherein calculating a calibration factor for the receiver based on the measurements, comprises:
    dividing the first ratio by the second ratio, wherein dynamic match effects in the RF system are removed by dividing the first ratio by the second ratio.

5. The method of claim 1, further comprising:
    storing the first and second ratios on a computer readable storage medium to maintain phase coherence of the calibration factor.

6. A system for calibrating receivers, comprising:
    a drive system configured to provide an input signal to a device under test (DUT);
    a receiver system, including one or more receivers, configured to receive one or more response signals from the DUT; and
    wherein the system is configured to
        set a drive level of the drive system, obtain a plurality of measurements at the set drive level, wherein two or more of the measurements are obtained at different gain states of a response signal received at a receiver from the one or more receivers, and calculate a calibration factor for the receiver based on the measurements;

wherein the system is configured to obtain the plurality of measurements at the set drive level by measuring a first input signal and measuring a first output response signal, in a first gain state, calculating a first ratio comprising the first output response signal divided by the first input signal, measuring a second input signal and measuring a second output response signal, in a second gain state, and calculating a second ratio comprising the second output response signal divided by the second input signal.

7. The system of claim 6, wherein a variable amplifier is used to change the gain state of the system.

8. The system of claim 6, wherein the receiver receives the output response signal using a coupler.

9. The system of claim 6, wherein the system is configured to calculate a calibration factor for the receiver based on the measurements by:

dividing the first ratio by the second ratio, wherein dynamic match effects in the RF system are removed by dividing the first ratio by the second ratio.

10. The system of claim 6, wherein the system is further configured to:

store the first and second ratios on a computer readable storage medium to maintain phase coherence of the calibration factor.

11. A method for calibrating receivers in radio frequency (RF) systems, comprising:

measuring a first input signal at a system in a first gain state;

measuring a first output response signal in the first gain state;

calculating a first ratio comprising the first output response signal divided by the first input signal;

measuring a second input signal at the system in a second gain state;

measuring a second output response signal in the second gain state;

wherein a drive level is kept the same when the system is in the first gain state and the second gain state;

calculating a second ratio comprising the second output response signal divided by the second input signal;

calculating a calibration factor for the system by dividing the first ratio by the second ratio.

12. The method of claim 11, further comprising:

changing a gain state of the system from the first gain state to the second gain state using a variable amplifier.

13. The method of claim 11, further comprising:

changing a gain state of the system from the first gain state to the second gain state using a variable attenuator.

14. The method of claim 11, wherein the system is a receiver of a vector network analyzer.

15. The method of claim 11 wherein each output response signal is received from a same calibration standard.

16. The method of claim 11, further comprising:

storing the first and second ratios to maintain phase coherence of the calibration factor.

\* \* \* \* \*